United States Patent Office 3,813,373
Patented May 28, 1974

3,813,373
METHOD FOR PRODUCING HIGH BULK DENSITY POLYVINYL CHLORIDE
Ikoh Ito, Takeshi Sekihara, and Tomoyuki Emura, Niihama, Japan, assignors to Sumitomo Chemical Company, Limited, Japan
No Drawing. Filed Oct. 17, 1972, Ser. No. 298,404
Int. Cl. C08f 1/11, 3/30
U.S. Cl. 260—92.8 W          5 Claims

ABSTRACT OF THE DISCLOSURE

Method for producing polyvinyl chloride having a high bulk density of more than 0.6 g./cc., superior free flow property and superior processability by suspension polymerization of vinyl chloride monomer in an aqueous medium in the presence of a specific water-soluble cellulose derivative and a specific alkali metal salt of an inorganic or organic acid by using an agitator having an agitating blade in which the ratio ($d/D$) of span ($d$) of the agitating blade to the inside diameter (D) of the polymerization vessel is 0.3 to 0.8 and further the tip speed of the agitating blade is not more than 7 m./sec.

---

The present invention relates to a method for producing polyvinyl chloride by suspension polymerization of vinyl chloride monomer. More particularly, it relates to a method for producing polyvinyl chloride having a high bulk density, superior free flow property and superior processability by suspension polymerization of vinyl chloride monomer in the presence of a specific water-soluble cellulose derivative and a specific alkali metal salt of an inorganic or organic acid under a specific agitating condition.

Polyvinyl chloride has been widely used in the fields of soft or rigid products in accordance with its superior mechanical property, incombustibility and chemical-proofing. Particularly, the demand for rigid extrusion products such as pipe and corrugated board has been increased.

For rigid extrusion finishing of polyvinyl chloride, it is preferable to increase the extrusion rate since the productivity rises in proportion to the increase of extrusion rate. It has been known that the extrusion rate is affected by the bulk density and free flow property of polyvinyl chloride and it can be increased when the bulk density is higher and the free flow property is larger.

However, vinyl chloride homopolymer produced by conventional suspension polymerizations has usually a bulk density of 0.35 to 0.60 g./cc. and therefore the extrusion rate thereof is not satisfactory.

In the meantime, as a method for the production of polyvinyl chloride having such high bulk density there has been known a method using polyvinyl pyrrolidone as a suspension stabilizer (Japanese Patent Publication No. 15,785/1969). However, even by such method, the bulk density is only 0.53 g./cc. in case of vinyl chloride homopolymer and the resin having bulk density more than 0.6 g./cc. can not be obtained. Furthermore, according to the known method the heat stability of the resin is significantly lowered and the processability is decreased and therefore the method is not necessarily suitable for practical use.

Under the circumstances, studies have been made to find out a novel method for producing polyvinyl chloride having a high bulk density of more than 0.6 g./cc.

It has now been found that the desired polyvinyl chloride having a bulk density of more than 0.6 g./cc. and superior processability can be produced by suspension polymerization in the presence of a specific cellulose derivative such as methyl cellulose and a specific alkali metal salt of an inorganic or organic acid such as trisodium phosphate or sodium acetate by using an agitator having agitating blade in which the ratio ($d/D$) of span ($d$) of the agitating blade to the inside diameter (D) of the polymerization vessel is 0.3 to 0.8 and further the tip speed of the agitating blade is not more than 7 m./sec.

Hitherto, a water-soluble cellulose derivative such as methyl cellulose has been widely used as a suspension stabilizer for suspension polymerization of vinyl chloride monomer. According to such known method, there could not be obtained such superior polyvinyl chloride having high bulk density as in the present invention.

Further, it has also been known that an alkali metal salt of an inorganic acid such as trisodium phosphate can be used as a buffering agent. However, the buffering agent has been merely used for the purpose of regulating the pH value of the reaction mixture within a fixed range and thereby aiding the smooth progression of the polymerization, regulating the particle diameter of the produced polymer and improving the heat stability of the product. It has never been known that the alkali metal salt of an inorganic acid is effective for raising the bulk density of the obtained polyvinyl chloride.

Moreover, for suspension polymerization of vinyl chloride monomer it is necessary to keep the monomer in a stable suspension state by means of dispersing the monomer in water in the form of fine droplets and making a suspension stabilizer adsorb around the monomer droplets and thereby preventing regathering of the droplets caused by their collision, and therefore the suspension polymerization has been usually carried out under high speed agitation, in which the shear effect is high. Accordingly, it has been considered that the polymerization under low speed agitation, in which the shear effect is low, gives undesirable results.

It has now been surprisingly found out that suspension polymerization of vinyl chloride monomer in the presence of a specific water-soluble cellulose derivative and a specific alkali metal salt of an inorganic or organic acid under low speed agitation, in which the shear effect is low, can give a desirable polyvinyl chloride having high bulk density, superior free flow property and superior processability.

An object of the present invention is to provide a method for producing polyvinyl chloride having high bulk density, superior free flow property and superior processability.

This and other objects will be apparent from the description hereinafter.

According to the present invention, vinyl chloride monomer is suspension-polymerized in an aqueous medium in the presence of about 0.01 to about 0.5% by weight (based on the weight of the monomer) of at least one water-soluble cellulose derivative selected from methyl cellulose, hydroxyethyl cellulose and hydroxypropoxymethyl cellulose and about 0.01 to about 1% by weight (based on the weight of the monomer) of at least one alkali metal salt of inorganic or organic acids selected from trisodium phosphate, tripotassium phosphate, disodium hydrogen phosphate, dipotassium hydrogen phosphate, sodium pyrophosphate, potassium pyrophoshate, sodium acetate, potassium acetate, sodium borate, potassium borate, sodium bicarbonate and potassium bicarbonate, by using an agitator having an agitating blade in which the ratio $(d/D)$ of the span $(d)$ of the agitating blade to the inside diameter (D) of polymerization vessel is 0.3 to 0.8 and further the tip speed of the agitating blade represented by the following equation is not more than 7 m./sec.

The tip speed of agitating blade=$N\pi d/60$ wherein N is impeller rotational speed (r.p.m.) of the agitating blade, $\pi$ is the circular constant and $d$ is span of agitating blade.

The advantages in the present method are that polyvinyl chloride having a high bulk density of more than 0.6 g./cc. can be readily produced on an industrial scale and further the polyvinyl chloride thus obtained has extremely superior processability.

Particularly, the present invention has a remarkable advantage that the present method can overcome the tendency in the conventional methods that the bulk density is lowered when the degree of the polymerization is higher, and polyvinyl chloride having high bulk density can be obtained even with a high degree of polymerization, i.e., a degree of polymerization of more than 1,000.

The present polyvinyl chloride having high bulk density, superior free flow property and superior processability is particularly useful for rigid extrusion finishing, for example pipe, corrugated board, and the like. The present polyvinyl chloride is also useful for injection molding and blow molding.

It is not made clear why polyvinyl chloride having high bulk density, superior free flow property and superior processability can be produced by the present method. It has, however, been observed that when the specific water-soluble cellulose derivative and the specific alkali metal salt of inorganic or organic acid used in the present method are used together, most of the added water-soluble cellulose derivative remains in the aqueous medium even at the end of the polymerization. From this fact, it is assumed that by using the present cellulose derivative and alkali metal salt together the monomer can be sufficiently dispersed even under low speed agitation which has hitherto been considered to be unfavorable since it is difficult to disperse the monomer sufficiently, and further the gathering of the particles can be prevented and the produced particles become almost spherical because of the low speed agitation, that is, by the mutual actions of the specific water-soluble cellulose derivative, the specific alkali metal salt and the specific agitation condition, the desired polyvinyl chloride having high bulk density, superior free flow property and superior processability can be produced.

The water-soluble cellulose derivatives used in present method are methyl cellulose, hydroxypropoxymethyl cellulose and hydroxyethyl celluose and they may be used in admixture as well as singularly. The water-soluble cellulose derivatives can be used within the range of about 0.01 to about 0.5% by weight, more preferably about 0.05 to about 0.15% by weight based on the weight of the monomer. Out of this range, the desired polyvinyl chloride can not be produced even if other conditions are within the range defined in the present invention. That is, when it is less than 0.01% by weight, the particle size of the produced polyvinyl chloride is remarkably coarse and the bulk density and the free flow property are lowered, and on the other hand, when it is more than 0.5% by weight, the particle size of the produced polyvinyl chloride is unfavorably too small.

If there is used instead of the present water-soluble cellulose derivative, any water-soluble polymer compound, such as polyvinyl alcohol, partially saponified polyvinyl alcohol and gelatin which have been usually used as a suspension stabilizer for conventional suspension polymerization of vinyl chloride, the desired polyvinyl chloride having high bulk density, superior free flow property and superior processability can not be produced even if the other conditions are within the range defined in the present invention.

The alkali metal salts of inorganic or organic acids used in the present method are trisodium phosphate, tripotassium phosphate, disodium hydrogen phosphate, dipotassium hydrogen phosphate, sodium pyrophosphate, potassium pyrophosphate, sodium acetate, potassium acetate, sodium borate, potassium borate, sodium bicarbonate and potassium bicarbonate, and they may be used in admixture as well as singularly. The alkali metal salts of inorganic or organic acids can be used within the range of about 0.01 to about 1% by weight, more preferably about 0.03 to about 0.3% by weight based on the weight of the monomer. Out of this range, the desired polyvinyl chloride cannot be produced even if the other conditions are within the range defined in the present invention. That is, when it is less than 0.01% by weight, the effect for raising the bulk density is lost, and on the other hand, when it is more than 1% by weight, the produced particles are unfavorably coarse. Moreover, if there is used any salts other than the present alkali metal salts of inorganic or organic acid, for example sodium carbonate, sodium sulfite, ammonium acetate, sodium dihydrogen phosphate, potassium dihydrogen phosphate, and the like, the desired polyvinyl chloride having high bulk density, superior free flow property and superior processability can not be produced even if the other conditions are within the range defined in the present invention. It is surprising that sodium carbonate and sodium dihydrogen phosphates being analogous to sodium bicarbonate and disodium hydrogen phosphate, respectively, are ineffective for the present method.

The present alkali metal salt of inorganic or organic acid may be added to the polymerization system in the form of a salt, or a free acid and an alkali may be added to the polymerization system, wherein the same ions as are added in the form of a salt are produced.

For the present suspension polymerization, there is used an agitator having an agitating blade in which the ratio $(d/D)$ of span $(d)$ of the agitating blade to the inside diameter (D) of the polymerization vessel is within the range of 0.3 to 0.8 and further the tip speed of the agitating blade represented by the following equation is less than 7 m./sec., preferably 1 to 7 m./sec.

The tip speed of agitating blade=$N\pi d/60$ wherein N is impeller rotational speed (r.p.m.) of the agitating blade, $\pi$ is the circular constant and $d$ is span of agitating blade. When the ratio of span of the agitating blade to the inside diameter of the polymerization vessel is more than 0.8, the dispersed particles of the monomer are liable to gather and thereby the bulk density of the produced polymer lowers, and on the other hand, when it is less than 0.3, the particle size distribution of the produced polymer is unfavorably extended. When the tip speed of the agitating blade is over 7 m./sec., the desired polyvinyl chloride having high bulk density, superior free flow property and superior processability can not be produced even if the other conditions are within the range defined in the present invention.

The polymerization vessel used in the present invention has the ratio of the height (L) (the length of the cylindrical part) to the inside diameter (D) being within the range of 1 to 3.

The suitable agitator for the present method is an impeller agitator having a curved raised turbine, the so-called Pfaudler type, but other types of agitator can be also used.

The remarkable effects in the present invention can be achieved particularly in case of suspension polymerization of vinyl chloride monomer alone. However, in case of suspension copolymerization of vinyl chloride and a monomer copolymerizable with vinyl chloride, such as ethylene, propylene, vinyl acetate, vinyl propionate, lauryl vinyl ether, isobutyl vinyl ether, methyl acrylate, methyl methacrylate, ethyl acrylate, butyl acrylate and octyl acrylate, the present method can also give vinyl chloride copolymer having higher bulk density than that by conventional methods, and therefore the present invention includes the case of copolymerization of vinyl chloride (main component) and the monomer mentioned above.

As the polymerization catalyst used in the present invention, there may be used any conventional oil-soluble catalyst for the supension polymerization of vinyl chloride. The examples of the oil-soluble catalyst are lauroyl peroxide, tertiary butyl peroxypivalate, diisopropyl peroxydicarbonate, di-secondary butyl peroxydicarbonate, azobisisobutyronitrile or a mixture thereof, but the catalyst which can be employed is not limited to these. The catalyst can be used in a dose of the range which is usually used for the suspension polymerization of vinyl chloride, i.e. in the range of 0.0005 to 3% by weight based on the weight of the monomer. The proportion of water to the monomer to be polymerized is not specifically restricted, but preferably it is in the range of 1.1 to 2.0 parts by weight of water to 1 part by weight of the monomer.

The polymerization system in the present method may be preferably maintained at a pH value of 5 to 9. For regulating the pH value, it is preferable to use the specific alkali metal salt of inorganic or organic acid used in the present invention. The polymerization of the present invention may be usually carried out at a temperature of 20 to 70° C.

In the present method, there may be further added to the polymerization system a molecular weight regulator (e.g. trichloroethylene), a cross-linking agent, a stabilizer, a filler and the like which do not give any undesirable effect to the polymerization. Furthermore, the present method can be carried out in the presence of a conventional lubricant, such as wax, low molecular weight polyethylene, higher alcohol, higher fatty acid or fatty acid ester (e.g. glycerine monostearate), by which the gelatin property of the resultant resin can be controlled.

As described above, the present invention provides a method for producing polyvinyl chloride having a high bulk density of more than 0.6 g./cc., superior free flow property and superior processability by suspension polymerization of vinyl chloride monomer in an aqueous medium in the presence of specific water-soluble cellulose derivatives and specific alkali metal salts of an inorganic or organic acid under a specific agitating condition and therefore has a remarkably important value for the industry.

The present method is illustrated by the following Examples but is not limited thereto. The various characteristics shown in the Examples were measured by the following method:

Bulk density: By JIS-K-6721.

Particle size distribution: By using standard screen defined by JIS-Z-8801.

Dry flow (free flow property): Represented by the time required when the resin (280 cc.) is allowed to fall from the funnel used for measuring the bulk density.

Extrusion rate: By weighing the extrudate in a fixed period.

EXAMPLE 1

In a stainless steel autoclave with an agitator having Pflaudler type three blades ($d=$span 110 cm.) and a jacket having a finger-baffle (the inside capacity: 6 M$^3$, $L/D=$ 1.33, D=165 cm.) were charged deionized water (2,500 kg.), a 2% aqueous solution of Methocel 65 HG-50 (hydroxypropoxymethyl cellulose, made by The Dow Chemical Co.) (75 liters), dipotassium hydrogen phosphate (1.0 kg.) and a 50% solution of diisopropyl peroxydicarbonate in toluene (450 g). After removing oxygen from the autoclave by deaeration until the pressure in the autoclave became 50 mm. Hg, vinyl chloride monomer (1,500 kg.) was charged thereto, and then the polymerization was carried out at the temperature of 57° C. under the agitating condition set forth in Table I.

The pressure in the autoclave was 9.2 kg./cm.$^2$ G at the beginning of the polymerization and became 7.2 kg./cm.$^2$ G after 9 hours. Then, the polymerization reaction was stopped and the unreacted vinyl chloride monomer was purged. The contents were taken out and dried.

The characteristics of the resulting polymer are shown in Table I. The yield of the polymerization was 85% and the degree of the polymerization was 1,100.

For comparison, the polymerization was carried out in the same manner as described above excepting that the tip speed of the agitating blade was 8.0 m./sec. The results are shown in Table I as Comparative Example 1.

TABLE I

| | The tip speed of agitating blade (m./sec.) | Bulk density (g./cc.) | Particle size distribution | | | Dry flow (free flow property) (sec.) |
|---|---|---|---|---|---|---|
| | | | 60 mesh pass | 100 mesh pass | 250 mesh pass | |
| Test number: | | | | | | |
| 1 | 2.9 | 0.62 | 98.2 | 64.3 | 0 | 21.5 |
| 2 | 4.6 | 0.66 | 99.5 | 98.1 | 2.7 | 22.0 |
| 3 | 6.3 | 0.64 | 99.3 | 87.5 | 6.5 | 20.9 |
| Comparative example 1 | 8.0 | 0.53 | 90.6 | 85.7 | 0 | 25.5 |

As made clear from the results shown in Table I, in Test numbers 1, 2 and 3 in accordance with the present invention, there could be produced vinyl chloride homopolymer having a high bulk density of more than 0.6 g./cc., superior free flow property and the main particle size being 100 to 200 mesh, and in Comparative Example 1, there was produced vinyl chloride homopolymer having a lower bulk density of 0.53 g./cc. and inferior free flow property.

From these facts, it should be understood that the tip speed of the agitating blade is an important factor for producing polyvinyl chloride having high bulk density and superior free flow property.

EXAMPLE 2

The polymerization was carried out in the same manner as in Example 1, Test number 2 excepting that the suspension stabilizer and the alkali metal salt set forth in Table II were used. The characteristics of the resulting polymer are shown in Table II. The yield of the polymerization was 85% and the degree of the polymerization was 1,100.

For comparison, the polymerization was carried out in the same manner as described above with the use together of a salt excluded from the present invention and a suspension stabilizer used in the present invention, and the use together of a suspension stabilizer excluded from the present invention and an alkali metal salt used in the present invention. The results are shown in Table II as Comparative Examples 2 to 7.

TABLE II

| | Water-soluble cellulose derivative | | Alkali metal salt | | Bulk density (g./cc.) | Particle size distribution | | | Dry flow (free flow property) (sec.) |
|---|---|---|---|---|---|---|---|---|---|
| | Kind | Quantity *1 | Kind | Quantity *1 | | 60 mesh pass | 100 mesh pass | 250 mesh pass | |
| Test number: | | | | | | | | | |
| 4 | Methocel 90 HG-100 *2 | 0.08 | Disodium hydrogen phosphate | 0.05 | 0.66 | 99.8 | 98.0 | 1.5 | 20.8 |
| 5 | Methocel SM-100 *3 | 0.08 | Potassium bicarbonate | 0.05 | 0.64 | 99.2 | 84.2 | 0.0 | 21.6 |
| 6 | Natrosol 240 JR *4 | 0.12 | Trisodium phosphate | 0.05 | 0.67 | 98.0 | 51.7 | 0.0 | 23.1 |
| 7 | Methocel 65 HG-50 | 0.08 | Tripotassium phosphate | 0.05 | 0.62 | 98.8 | 88.6 | 1.0 | 21.2 |
| 8 | do | 0.08 | Sodium pyrophosphate | 0.05 | 0.63 | 99.7 | 96.3 | 2.7 | 21.3 |
| 9 | do | 0.08 | Potassium acetate | 0.05 | 0.66 | 99.6 | 98.6 | 0.0 | 22.5 |
| 10 | do | 0.08 | Sodium bicarbonate | 0.10 | 0.61 | 97.8 | 96.1 | 3.0 | 20.9 |
| 11 | do | 0.08 | Sodium borate | 0.20 | 0.62 | 99.4 | 80.4 | 0.4 | 23.3 |
| Comparative example: | | | | | | | | | |
| 2 | Methocel 65 HG-50 | 0.08 | Sodium carbonate | 0.20 | 0.53 | 93.2 | 59.6 | 0.1 | 24.8 |
| 3 | do | 0.08 | Sodium dihydrogen phosphate | 0.20 | 0.48 | 98.0 | 66.6 | 0.0 | 26.3 |
| 4 | do | 0.08 | Sodium sulfite | 0.20 | 0.48 | 99.6 | 80.0 | 2.4 | 27.7 |
| 5 | do | 0.08 | Ammonium acetate | 0.20 | 0.52 | 96.0 | 78.6 | 5.2 | 24.0 |
| 6 | do | 0.08 | | | 0.45 | 83.5 | 53.5 | 0.0 | 22.1 |
| 7 | Gosenol KH-17 *5 | 0.10 | Sodium bicarbonate | 0.05 | 0.49 | 96.5 | 77.3 | 0.3 | 26.5 |

*1 Percent by weight based on the weight of the monomer. *2 Hydroxypropoxymethyl cellulose, made by The Dow Chemical Co. *3 Methyl cellulose, made by The Dow Chemical Co. *4 Hydroxyethyl cellulose, made by Hercules Inc. *5 Partially saponified polyvinyl alcohol, made by Nippon Gosei K.K.

As understood from the results shown in Table II, in Test numbers 4 to 11 in accordance with the present invention, there was produced vinyl chloride homopolymer having a high bulk density of more than 0.6 g./cc. and a superior free flow property, and on the other hand, in Comparative Examples 2, 3, 4 and 5, in which a salt or a suspension stabilizer excluded from the present invention was added, and in Comparative Example 6, in which no salt was added, there was merely produced vinyl chloride homopolymer having a lower bulk density and inferior free flow property.

Further, Comparative Example 7 shows that the present object can not be achieved by using partially saponified polyvinyl alcohol excluded from the present invention and sodium bicarbonate included in the present invention.

EXAMPLE 3

In the same autoclave as used in Example 1 were charged deionized water (2,500 kg.), a 2% aqueous solution of Methocel 90 HG-100 (60 liters), sodium acetate (750 g.) and dilauroyl peroxide (1.5 kg.). After deaeration of the autoclave, vinyl chloride monomer (1,500 kg.) was charged thereto, and then the polymerization was carried out at the temperature of 64° C. under agitation of the tip speed of the agitating blade of 6.4 m./sec.

The pressure in the autoclave was 10.5 kg./cm.² G at the beginning of the polymerization and became 8.5 kg./cm.² G after 9 hours. Then, the polymerization reaction was stopped and the unreacted vinyl chloride monomer was purged. The contents were taken out and dried to give vinyl chloride homopolymer having an average degree of polymerization of 830, the yield being 87%.

The resulting vinyl chloride homopolymer was a preferable one which had an extremely high bulk density of 0.67 g./cc. and a medium particle size distribution of 60 mesh to 200 mesh.

In the above method, when potassium pyrophosphate or potassium borate was used instead of sodium acetate, almost the same results were obtained.

For comparison, the polymerization was carried out in the same manner as described above excepting that sodium acetate was not used. The bulk density of the produced vinyl chloride homopolymer was 0.47 g./cc.

EXAMPLE 4

Extrusion tests of the resins obtained by the Examples and Comparative Examples shown hereinbefore were performed. Resin (100 parts by weight), tribasic lead sulfate (3 parts by weight) and stearic acid (2 parts by weight) were blended for 20 minutes by a ribbon blender. The resultant was extruded in the form of a pipe having an outside diameter of 45 mm.φ at 18 r.p.m. by using a twine screw extruder (RC-100 type, made by Ikegail Seisakusho), in which the temperature of the cylinder was 148° C. below the hopper, 160° C. at the middle of the cylinder and 170° C. at the outlet of the cylinder, and the temperature of the die was 185° C. at the inlet and 190° C. at the outlet. The results are shown in Table III.

TABLE III

| Test number | Test number of resin | Bulk density after blending (g./cc.) | Extrusion rate (kg./hr.) | Appearance of pipe |
|---|---|---|---|---|
| 1 | Test 2 | 0.68 | 21.0 | Smooth, glossy, good. |
| 2 | Test 5 | 0.67 | 20.3 | Do. |
| 3 | Test 9 | 0.67 | 20.8 | Do. |
| 4 | Comparative Example 1 | 0.57 | 13.8 | Smooth, not glossy, good. |
| 5 | Comparative Example 4 | 0.54 | 12.5 | Do. |

As made clear from the results shown in Table III, the polyvinyl chloride obtained by the present method was extremely large in the extrusion rate and the characteristics of the extruded product were superior in comparison with the polyvinyl chloride obtained by the conventional suspension polymerization methods, and therefore it will be understood that the present polyvinyl chloride is useful for industry.

EXAMPLE 5

In a glass-lined autoclave with an agitator having a Pfaudler type curved raised turbine ($d$=span 350 mm.φ) and a jacket having a finger-baffle (the inside capacity: 100 liters, $L/D$=1.2, D=500 mm.φ) were charged deionized water (44.5 liters), a 5% aqueous solution of Methocel 90 HG-100 (480 ml.), disodium hydrogen phosphate (30 g.) and a 50% solution of diisopropyl peroxydicarbonate in toluene (12 g.). After removing oxygen from the autoclave by deaeration until the pressure in the autoclave became 20 mm. Hg, vinyl chloride monomer (30 kg.) was charged thereto, and then the polymerization was carried out at the temperature of 57° C. under the agitating condition of the tip speed of the agitating blade being 6.0 m./sec.

The pressure in the autoclave was 9.2 kg./cm.² G at the beginning of the polymerization and became 7.2 kg./cm.² G after 9 hours. Then, the polymerization reaction was stopped and the unreacted vinyl chloride monomer was purged. The contents were taken out and dried.

The characteristics of the resulting polymer are shown in Table IV. The yield of the polymerization was 85% and the average degree of the polymerization was 1,100.

For comparison, the polymerization was carried out in the same manner as described above excepting that the agitating blade had a span of 450 mm.$\phi$ and the tip speed of the agitating blade was controlled the same as above. The results are shown in Table IV as Comparative Example 8.

TABLE IV

| | Span (mm.$\Phi$) | $d/D$ | Bulk density (g./cc.) | Particle size distribution | | | Dry flow (free flow property (sec.) |
|---|---|---|---|---|---|---|---|
| | | | | 60 mesh pass | 100 mesh pass | 250 mesh pass | |
| Test Number 12 | 350 | 0.7 | 0.64 | 97.4 | 60.3 | 1.2 | 21.1 |
| Comparative Example 8 | 450 | 0.9 | 0.55 | 93.1 | 52.3 | 5.1 | 26.0 |

What is claimed is:

1. A method for producing polyvinyl chloride having high bulk density which comprises suspension-polymerizing vinyl chloride monomer in an aqueous medium in the presence of about 0.01 to about 0.5% by weight (based on the weight of the monomer) of at least one water-soluble cellulose derivative selected from the group consisting of methyl cellulose, hydroxypropoxymethyl cellulose and hydroxyethyl cellulose and about 0.01 to 1% by weight (based on the weight of the monomer) of at least one alkali metal salt of an inorganic or organic acid selected from the group consisting of trisodium phosphate, tripotassium phosphate, disodium hydrogen phosphate, dipotassium hydrogen phosphate, sodium pyrophosphate, potassium pyrophosphate, sodium acetate, potassium acetate, sodium bicarbonate, potassium bicarbonate, sodium borate and potassium borate, by using an agitator having an agitating blade in which the ratio $(d/D)$ of span $(d)$ of the agitating blade to the inside diameter (D) of the polymerization vessel is 0.3 to 0.8 and the tip speed of the agitating blade represented by the following equation is not more than 7 m./sec.: the tip speed of the agitating blade=$N\pi d/60$ wherein N is the impeller rotational speed (r.p.m.) of the agitating blade, $\pi$ is the circular constant and $d$ is the span of the agitating blade.

2. The method according to claim 1, wherein the polymerization vessel has a ratio $(L/D)$ of height (L) to inside diameter (D) within the range of 1 to 3 and is provided with an agitator having a Pfaudler type agitating blade.

3. The method according to claim 1, wherein the water-soluble cellulose derivative is used within the range of about 0.05 to about 0.15% by weight and the alkali metal salt of inorganic or organic acid is used within the range of about 0.03 to about 0.3% by weight.

4. The method according to claim 1, wherein the suspension polymerization is carried out in the presence of an oil-soluble catalyst selected from the group consisting of lauroyl peroxide, tertiary butyl peroxypivalate, diisopropyl peroxydicarbonate, disecondary butyl peroxydicarbonate, azobisisobutyronitrile and mixtures thereof.

5. The method according to claim 1, wherein the suspension polymerization is carried out at a pH of 5 to 9 and a temperature of 20 to 70° C.

References Cited
UNITED STATES PATENTS

| 3,682,877 | 8/1972 | Czekay et al. | 260—92.8 W |
| 3,701,742 | 10/1972 | Richardson et al. | 260—17 R |
| 3,663,482 | 5/1972 | Gammon | 260—17 R |

JOSEPH L. SCHOFER, Primary Examiner

J. KIGHT, Assistant Examiner

U.S. Cl. X.R.

260—17 R